(12) United States Patent
Kirby

(10) Patent No.: US 11,796,433 B2
(45) Date of Patent: Oct. 24, 2023

(54) APPARATUS AND METHOD FOR MATERIAL TESTING INCLUDING REGENERATIVE ENERGY STORAGE

(71) Applicant: Illinois Tool Works Inc., Glenview, IL (US)

(72) Inventor: Andrew Kirby, High Wycombe (GB)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/501,624

(22) Filed: Oct. 14, 2021

(65) Prior Publication Data

US 2022/0136942 A1    May 5, 2022

(30) Foreign Application Priority Data

Oct. 30, 2020 (GB) ...................................... 2017212
Jul. 29, 2021 (EP) ...................................... 21188388

(51) Int. Cl.
*G01N 3/02* (2006.01)
*G01N 3/08* (2006.01)
*G01N 19/00* (2006.01)

(52) U.S. Cl.
CPC .......... *G01N 3/02* (2013.01); *G01N 2203/003* (2013.01); *G01N 2203/0202* (2013.01); *G01N 2203/04* (2013.01)

(58) Field of Classification Search
CPC .... G01N 3/06; G01N 3/08; G01N 2203/0202; G01N 2203/0016; G01N 3/48; G01N 3/52; G01N 2033/008; G01N 19/00; G01N 3/02; G01N 3/00; G01N 3/38; G01N 25/20; G01R 31/2874; G01R 22/066; G01L 3/22
See application file for complete search history.

(56) References Cited

U.S. PATENT DOCUMENTS

| 5,739,411 | A | 4/1998 | Lee | |
|---|---|---|---|---|
| 2011/0227565 | A1 | 9/2011 | Morton | |
| 2020/0173893 | A1* | 6/2020 | Peterson | G01N 3/08 |
| 2020/0173895 | A1* | 6/2020 | Pope | G01N 3/06 |

FOREIGN PATENT DOCUMENTS

| CN | 108426771 | 8/2018 |
|---|---|---|
| GB | 2475683 | 6/2011 |
| WO | 2020097659 | 5/2020 |

OTHER PUBLICATIONS

European Communication with extended Search Report Appln No. 21188388.9 dated Jan. 25, 2022.

* cited by examiner

*Primary Examiner* — Brandi N Hopkins
(74) *Attorney, Agent, or Firm* — McAndrews, Held & Malloy, Ltd.

(57) ABSTRACT

Example material testing apparatus comprise: guide means; sample holding means for holding a sample; force means comprising a first actuator for applying a releasable force to the sample; a crosshead supported on the guide means and arranged to support at least a portion of one or both of the sample holding means and the force means; an energy store arranged to store regenerative energy from at least the first actuator; an energy consumer arranged to, at least in part, consume energy from the energy store, wherein the energy consumer comprises the first actuator; and a controller configured to control the first actuator to release the force applied to the sample, wherein the first actuator is arranged to output the regenerative energy in dependence on the release of the force.

14 Claims, 4 Drawing Sheets

APPARATUS AND METHOD FOR MATERIAL TESTING INCLUDING REGENERATIVE ENERGY STORAGE

RELATED APPLICATIONS

The present application claims the benefit of United Kingdom (GB) Patent Application Serial No. 2017212.8, filed Oct. 30, 2020, entitled "APPARATUS AND METHOD FOR MATERIAL TESTING," and of European (EP) Patent Application Serial No. 21188388.9, filed Jul. 29, 2021, entitled "APPARATUS AND METHOD FOR MATERIAL TESTING." The entireties of United Kingdom (GB) Patent Application Serial No. 2017212.8 and European (EP) Patent Application Serial No. 21188388.9 are expressly incorporated herein by reference.

FIELD

This invention relates to apparatus and methods for material testing.

BACKGROUND

Material testing machines (also sometimes known as structural tests machines) are used to test the physical characteristics of a material sample. Material testing machines use sample holding means to hold the material sample and force means to apply a force to the material sample. Energy is utilized to apply the force to the sample via the force means and to provide acceleration to moving parts of the material testing machine. Some of this energy is retained as potential energy in the machine (for example, a spring being compressed) or as kinetic energy caused by momentum of moving parts. When the force applied to the sample is released or deceleration is applied, some of this energy flows back into the material testing apparatus as 'regenerative energy'. Typically, the energy is 'burned off' in dynamic braking resistors as heat, which is then wasted and contributes to thermal load that the machine presents to any climate control systems in a laboratory with the material testing machine.

It is an object of the present invention to mitigate at least some of the above problems.

BRIEF SUMMARY OF THE DISCLOSURE

In accordance with the present inventions there is provided a material testing apparatus, comprising: guide means; sample holding means for holding a sample; force means comprising a first actuator for applying a releasable force to the sample; a crosshead supported on the guide means and arranged to support at least a portion of one or both of the sample holding means and the force means; an energy store arranged to store regenerative energy from at least the first actuator; an energy consumer arranged to, at least in part, consume energy from the energy store, wherein the energy consumer comprises the first actuator; and a controller configured to control the first actuator to release the force applied to the sample, wherein the first actuator is arranged to output the regenerative energy in dependence on the release of the force.

Optionally, the energy consumer may comprise a second actuator. Furthermore, the controller may be configured to control the second actuator, wherein the second actuator may be arranged to output regenerative energy.

In some embodiments, the energy store may comprise at least one energy storage device. In some embodiments, the energy store may comprise at least one capacitor.

Optionally, the first actuator may be arranged to, at least in part, consume the energy from the energy store to apply the releasable force to the sample.

The energy consumer may comprise at least one of a cooling system or one or more control electronics.

In accordance with the present inventions there is provided a method of operating a material testing apparatus, the material testing apparatus comprising guide means, sample holding means for holding a sample, force means comprising a first actuator for applying a releasable force to the sample, a crosshead supported on the guide means and arranged to support at least a portion of one or both of the sample holding means and the force means; and wherein the method comprises: controlling the first actuator to release the force applied to the sample; outputting, by the first actuator, regenerative energy in dependence on the release of the force; storing the regenerative energy from at least the first actuator in an energy store; and consuming, by an energy consumer at least in part, energy stored in the energy store, wherein the energy consumer comprises the first actuator.

Optionally, the method may comprise controlling of a second actuator of the energy consumer and outputting, by the second actuator, regenerative energy.

In some embodiments, the method comprises storing the regenerative energy in at least one energy storage device of the energy store. In some embodiments, the method comprises storing the regenerative energy in at least one capacitor of the energy store.

In some embodiments, the method comprises at least one of a cooling system or one or more control electronics consuming, at least in part, the energy from the energy store.

Optionally, the method may comprise consuming, by the first actuator at least in part, the energy from the energy store to apply the releasable force to the sample.

According to an embodiment of the present invention, there is provided computer software which, when executed, is arranged to perform any method described above.

BRIEF DESCRIPTION OF THE DRAWINGS

Embodiments of the invention are further described hereinafter with reference to the accompanying drawings, in which.

DETAILED DESCRIPTION

Throughout this application, references to "sample" are intended to refer to a specimen, such as a material specimen for testing. The specimen may be a piece of material which is placed into a material testing machine to be tested. The material testing machine may exert a force on the specimen to the test various physical properties of the material of the specimen. The specimen may be, for example, taken from a production process of the material as a sample of the material being produced.

Figure 1:
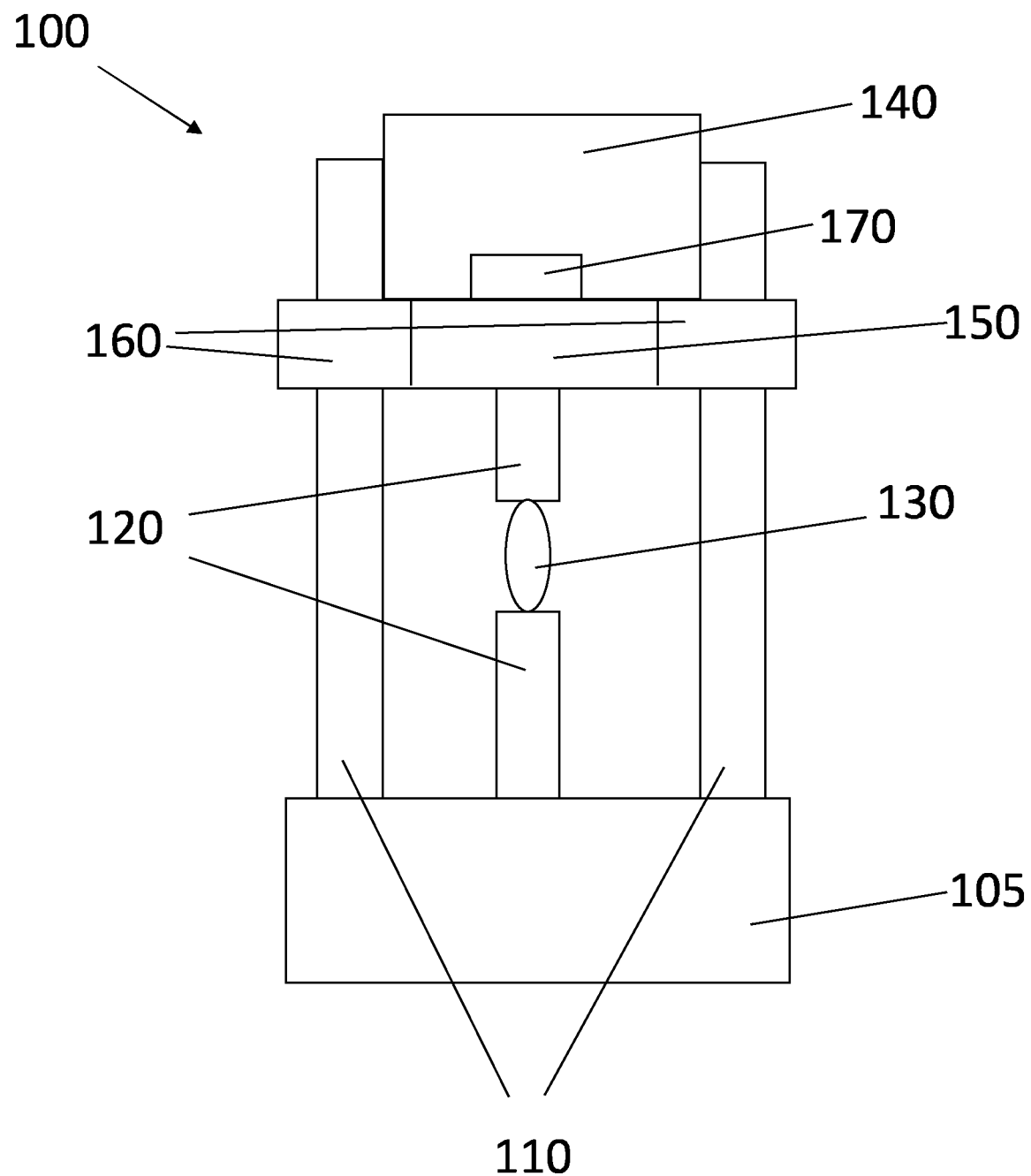
FIG. 1 illustrates an apparatus according to an embodiment of the present invention.

FIG. 1 illustrates a material testing apparatus according to an embodiment of the present invention, indicated generally by reference numeral 100. The material testing apparatus 100 may be configured to perform a method according to an embodiment of the invention as described below in relation to FIG. 4. The material testing apparatus 100 comprises sample holding means 120, such as a sample holding device, for holding a sample 130 and force means 140, such as a force apparatus, comprising a first actuator for applying a releasable force to the sample 130.

The first actuator 210 of the force apparatus 120 is arranged to apply a releasable force to the sample 130, which may be to test the physical properties of the sample 130. The first actuator 210 may repeatedly apply force to the sample 130. For example, the first actuator 210 may apply a deformation or testing force to the deform the sample 130, by one or more of stretching, compression or torsion. The first actuator 210 may be an electric or electromechanical actuator. However, other types of actuators will be envisaged.

It will be appreciated that when the first actuator 210 applies the releasable force to the sample, 130, at least some energy utilised by the actuator 210 to apply the force is retained in the material testing apparatus 100. For example, at least some energy utilised to apply the force may be retained as potential energy, for example a spring being compressed, or as kinetic energy caused by momentum of components of the apparatus 100 which are moved to apply the force to the sample 130. When the applied force is released, for example, the first actuator 210 releases the force applied to the sample 130, at least some of the retained energy is received by the material testing apparatus 100 as regenerative energy. Therefore, the first actuator 210 outputs the regenerative energy in dependence on the release of the force applied to the sample 130. The regenerative energy may be in the form of electrical energy.

The regenerative energy may be released when deceleration is applied to the components of the apparatus 100 which are moved to apply the force to the sample 130. Various components of the material apparatus 100 are moved to apply the force to the sample 130. For example, the force apparatus 140 including the first actuator 210 may be moved to apply the force to the sample 130. Thus, when the deceleration is applied to the first actuator 210, at least some energy, such as retained kinetic energy, is outputted into the material testing apparatus 100 as regenerative energy. The first actuator 210 may deaccelerate when it reaches a physical limit causing movement of the first actuator 210 to stop or when the first actuator 210 is controlled to stop via a brake or control signal.

However, the regenerative energy may be excess energy in that it is waste energy that can be removed from the system. In existing apparatuses, such regenerative energy is removed from the material testing apparatus 100 by being 'burned off' such as in dynamic braking resistors as heat. Therefore, the regenerative energy is wasted and contributes to thermal load that the material testing apparatus 100 presents to any climate control systems in an environment, such as a laboratory, in which the material testing machine 100 is located.

In embodiments of the present invention, the regenerative energy output by the first actuator 210 is stored in the material testing apparatus 100 for use. Advantageously the regenerative energy is not therefore wasted and may instead be used by the material testing apparatus 100.

Figure 2:
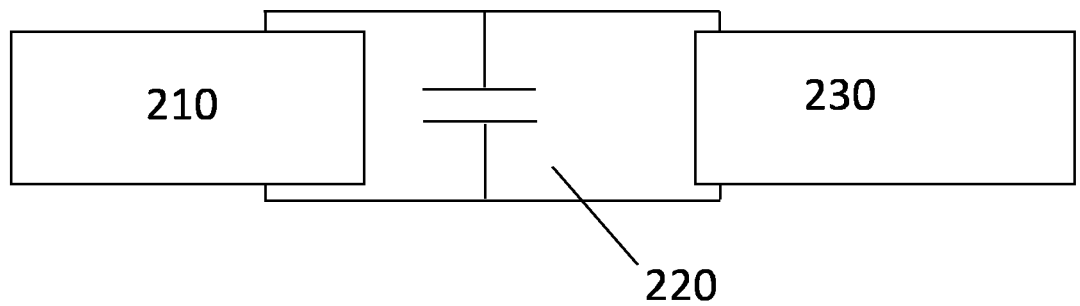
FIG. 2 illustrates a schematic according to an embodiment of the present invention.

FIG. 2 illustrates a schematic diagram of an electrical system of the testing apparatus 100 according to an embodiment of the present invention. In particular, FIG. 2 illustrates the first actuator 210 of the force apparatus 140, an energy store 220 and an energy consumer 230. The energy store 220 is arranged to store regenerative energy from at least the first actuator 210. When the regenerative energy is output from the first actuator 210, the regenerative energy is be transferred to the energy store 220. For example, an electronic circuit is implemented in which the regenerative energy output from the first actuator 210 is directed to the energy store 220 to be stored by using at least one switching device, such as a relay switch or solid state switch, which directs the regenerative energy output from the first actuator 210 to the energy store 220.

In some embodiments, the energy store 220 comprises at least one energy storage device. The at least one energy storage device may comprise an electrical or electromechanical energy storage device. For example, the energy store 220 may comprise at least one battery. The energy store 220 may comprise at least one capacitor as shown in FIG. 2 with it being appreciated that this is merely an example. As such, when the energy store 220 stores the regenerative energy this may correspond to at least partly charging the at least one capacitor 220. When the energy store 220 comprises at least one capacitor, the energy store 220 stores the regenerative energy for at least a short period of time. However, the energy store 220 may store the regenerative energy for a longer period of time in dependence on the type of energy store 220, for example if the energy store 220 is a battery.

Advantageously, by storing the regenerative energy from the first actuator 210, the energy wasted by the material testing apparatus 100 is reduced because the regenerative energy is retained the material testing apparatus 100 in contrast to being burned off heat.

Advantageously, the energy store 220 may comprise an array (e.g. more than 2, more than 6, or more than 10) of "small" capacitors ("small" may be up to a capacitance of e.g. 50 µF, or e.g. 500 µF). For example, an array of 12 capacitors each with a capacitance of 470 µF may be used. Using such an array of smaller capacitors may improve a high frequency response of the energy store 220, which in turn may enable the energy store 220 to react quickly to the incoming regenerative energy. Using such an array of small capacitors may provide the effect of impedance matching a motor drive of the material testing apparatus 100, to prevent unwanted transients and resonances in a power circuit of the material testing apparatus 100. It will be appreciated that different sized arrays with different sized capacitors may be used to achieve the same or similar advantageous effects.

As mentioned above, the electrical system of FIG. 2 comprises the energy consumer 230. The energy consumer 230 is arranged to, at least in part, consume energy from the energy store 220. The energy consumer 230 is a device arranged to consume energy in order to perform an operation. The energy consumer 230 comprises the first actuator 210. For example, the first actuator 210 may be arranged to, at least in part, consume the energy from the energy store 220 to apply the releasable force to the sample 130. An electronic circuit may be implemented in which the energy stored in the energy store 220 is transferred to the energy consumer 230 to be utilised therein. The energy consumer 230 may also consume energy from another energy source in combination with the energy from the energy store 220. For example, the energy consumer 230 may consume energy from a mains electrical supply provided to the apparatus 100, particularly when the energy in the energy store 200 is insufficient to power the energy consumer 230. When the energy store 220 is at least one capacitor and the energy consumer 230 consumes the energy from the energy store 230 this may correspond to at least partly discharging the at least one capacitor.

Advantageously, arranging the energy consumer 230 to consume the energy from the energy store 220 improves the energy efficiency of the material testing apparatus 100 because the material testing apparatus 100 is able to reuse energy.

In some embodiments, the energy consumer 230 may comprise a second actuator 230. The second actuator of the energy consumer 230 may be arranged to, at least in part, consume energy from the energy store 220. The second actuator may be an electrical or electromechanical actuator. However, other types of actuators will be envisaged. The second actuator of the energy consumer 230 may also be arranged to output regenerative energy in dependence on an operation performed by the energy consumer 230. That is, the output of the regenerative energy from the second actuator, i.e. the actuator of the energy consumer 230 is released during its operation. As such, the second actuator does not continuously output regenerative energy.

Therefore, the first actuator 210 and second actuator of the energy consumer 230 may release regenerative energy. That is, the first actuator 210 may output a first regenerative energy and the second actuator 230 may output a second regenerative energy. The second actuator may output the second regenerative energy when performing an operation in which energy is released.

In some embodiments, the energy consumer 230 may comprise at least one of a cooling system or one or more control electronics of the testing apparatus 100. The operation performed by the cooling system in which the energy from the energy store is consumed may be operation of a fan, heat pump or peltier cooling system. The operation performed by the one or more control electronics may be to control other components of the material testing apparatus 100. It will be appreciated that the energy consumer 230 may comprise other subsystems of the material testing apparatus 100, such that the energy consumer 230 may comprise a subsystem other than the provided examples of the cooling system and one or more control electronics.

At least one of the cooling system, one or more control electronics and other subsystem of the material testing apparatus 100 may be arranged to, at least in part, consume energy from the energy store 220. Furthermore, at least one of the cooling system, one or more control electronics and other subsystem of the material testing apparatus 100 may be arranged to output regenerative energy in dependence on an operation performed by the energy consumer 230.

In some embodiments, at least one of the cooling system, one or more control electronics and other subsystem of the material testing apparatus 100 may comprise the second actuator described above. Therefore, at least one of the cooling system, one or more control electronics and any other subsystem of the material testing apparatus 100 may be arranged to, at least in part, consume energy from the energy store 220. Furthermore, at least one of the cooling system, one or more control electronics and other subsystem of the material testing apparatus 100 may be arranged to output regenerative energy in dependence on an operation performed by the energy consumer 230.

Advantageously, when the energy consumer 230 comprises a plurality of the first actuator 210, the second actuator, the cooling system, one or more control electronics and other subsystem of the material testing apparatus 100, the possibility of the energy store 220 overflowing with excess regenerative energy is reduced. Since multiple components of the material testing apparatus 100 consume the regenerative energy stored in the energy store 220, the regenerative energy is recycled across a plurality of components on the material testing apparatus 100.

The energy store 220 may be arranged to store the regenerative energy output by the second actuator 230 or at least one of the cooling system, one or more control electronics and other subsystem of the material testing apparatus 100. That is, the energy store 220 may store the second regenerative energy. For example, an electronic circuit may be implemented in which the regenerative energy output from the second actuator is directed to the energy store 220 to be stored by using at least one switching device, such as a relay switch or solid state switch, which directs the second regenerative energy output from the second actuator to the energy store 220.

The material testing apparatus 100 comprises a controller 170 configured to control various operations of the material testing apparatus 100. The controller 170 is configured to control the first actuator 210 to apply and to release the force applied to the sample 130, wherein the first actuator 210 is arranged to output the regenerative energy in dependence on the release of the force. As discussed above, at least some energy utilised to apply the force on the sample 130 is retained in the material testing apparatus 100 and the regenerative energy is output from the first actuator 210 in dependence on release of the force applied to the sample 130.

The controller 170 may be configured to control at least one of the second actuator of the energy consumer 230, the cooling system, one or more control electronics and other subsystem of the material testing apparatus 100. At least one of the second actuator 230, the cooling system, one or more control electronics and other subsystem of the material testing apparatus 100 may be arranged to output regenerative energy, which may be the second regenerative energy, as discussed above.

The force apparatus 120 may apply the force via the sample holding device 120. In some embodiments the force to be applied to the sample 130 is applied by moving the sample holding device 120. The force apparatus 120 may be arranged to apply the force to one end of the sample 130 or two opposing ends of the sample 130. The force apparatus 120 may be adapted according to force requirements and/or a shape and size of the material testing apparatus 100. The first actuator 210 may be arranged to, in use, move at least one portion of the sample holding device 120 to apply force to the sample 130 held therein.

Referring back to FIG. 1, as mentioned above, FIG. 1 illustrates the sample holding device 120 may be arranged to grip the sample 130 and may be comprised of a plurality of members, such that the sample 130 is gripped when placed between members of the sample holding device 120. For example, the sample holding device 120 may comprise a plurality of grips, such as claws, each arranged at opposing ends of the sample 130. In some embodiments, there is a pair of grips.

The sample holding device 120 may be configured to withstand a maximum force to be applied to the sample by the material testing apparatus 100. As such, the sample holding device 120 may be structured and formed of a material such that the sample holding device 120 is not deformed by a force less than or equal to the maximum force to be applied to the sample 130. The sample holding device 120 may therefore be adapted according to force requirements and/or a shape and size of the sample 130 to be tested.

The sampling holding device 120 may be arranged horizontally or vertically in dependence on a type and amount of force to be applied to the sample. However, it will be appreciated that other structures and forms of sample holding device will be envisaged.

FIG. 1 also illustrates guide means 110, such as a guide, and a crosshead 150. The crosshead 150 is supported on the guide 110 and arranged to support at least a portion of one or both of the sample holding device 120 and the force apparatus 140. Advantageously, using the crosshead 150 as a support for other components of the material testing apparatus 100 results in a compact apparatus. In the embodiment illustrated in FIG. 1, the force apparatus 140 is supported by the crosshead 150 in that the force apparatus 140 is located on the crosshead 150. Furthermore, an upper part of the sample holding device 120 is supported by the crosshead 150 in that in some embodiments the upper part is suspended below the crosshead 150. The crosshead 150 may be adapted according to force requirements and/or a shape and size of the material testing apparatus 100.

The guide means 110 may be a guide arranged to support the crosshead 150 and guide a movement of the crosshead 150 about the guide 110. The guide 110 may be supported by a base 105 of the material testing apparatus 100. In the embodiment illustrated in FIG. 1, the guide 110 comprises two stanchions, laterally separated by less than a width of the crosshead 150 which extend vertically from the base 105. It will be appreciated that the guide 110 may be configured according to force requirements and/or a shape and size of the material testing apparatus 100. For example, the guide 110 may comprise one stanchion. Each guide in the illustrated embodiment has a generally circular lateral cross-section although it will be appreciated that other cross-sectional shapes of the guide means may be envisaged.

The crosshead 150 may be vertically moveable about the guide 110. In the embodiment in FIG. 1, the crosshead 150 may be arranged to vertically move along the two stanchions of the guide 110 in first and second opposed directions about the guide 110, which relates to up and down directions along the guide 110. The crosshead 150 may be manually moved vertically about the guide 110 by a user using a handle or lever or may be moved electronically using crosshead drive means 180, which may be a crosshead drive mechanism. The movement of the crosshead 150 vertically about the guide 110 may be referred to as a crosshead drive operation.

The crosshead drive mechanism 180 may comprise a combination of electrical and mechanical components arranged in such a way as to move the crosshead 150 vertically about the guide 110. For example, the crosshead drive mechanism 180 may comprise an electric machine and may include a mechanism to convert rotational motion of the electric machine into linear motion of the crosshead 150 about the guide 110.

In the crosshead drive operation, the crosshead 150 is moved such as lifted to allow the sample 130 to be inserted or removed from the material testing apparatus 100 and to accommodate samples of different sizes to be tested. The movement of the crosshead 150 about the guide 110 enables a position of the sample holding device 120 to be adjusted in dependence on the size of the sample 130.

The material testing apparatus 100 of some embodiments may comprise clamping means 160, such as a clamping apparatus, arranged to apply a releasable clamping force to the guide 110 to secure the crosshead 150 at a location with respect to the guide 110. The clamping apparatus 160 may comprise at least one clamping member (not illustrated) arranged to apply the releasable clamping force. The at least one clamping member may be at least partially moveable and arranged to contact the guide 110. As a result of the contact between the at least one clamping member and the guide 110, the clamping force may be a friction force between the at least one clamping member and the guide 110. In some embodiments, the clamping apparatus 160 may comprise an electric clamping apparatus. For example, the electric clamping apparatus may comprise an electric machine to control movement of the at least one clamping member.

Figure 3:
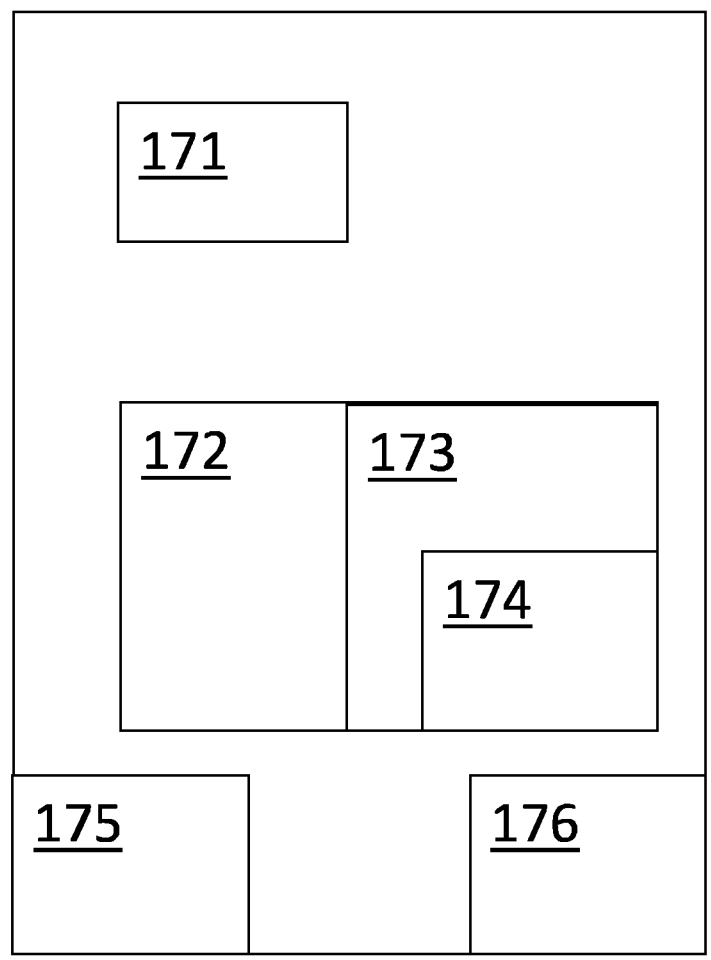
FIG. 3 illustrates a controller according to an embodiment of the invention.

As shown in FIG. 3, the controller 170 may be implemented by a processor 171 and a memory 172 including a computer program 173 comprising computer program instructions 174. The processor 171 may comprise an output interface 175 via which data and/or commands in the form of control signals are output by the processor and an input interface 176 via which data and/or commands are input to the processor. Implementation of the controller 170 can be in hardware alone (a circuit), have certain aspects in software including firmware alone or can be a combination of hardware and software (including firmware). The computer program 173 may be stored on a computer readable storage medium (disk, memory etc). The computer program 173 may be computer software which, when executed, is arranged to perform a method according to the method described below in relation to FIG. 4.

Figure 4:
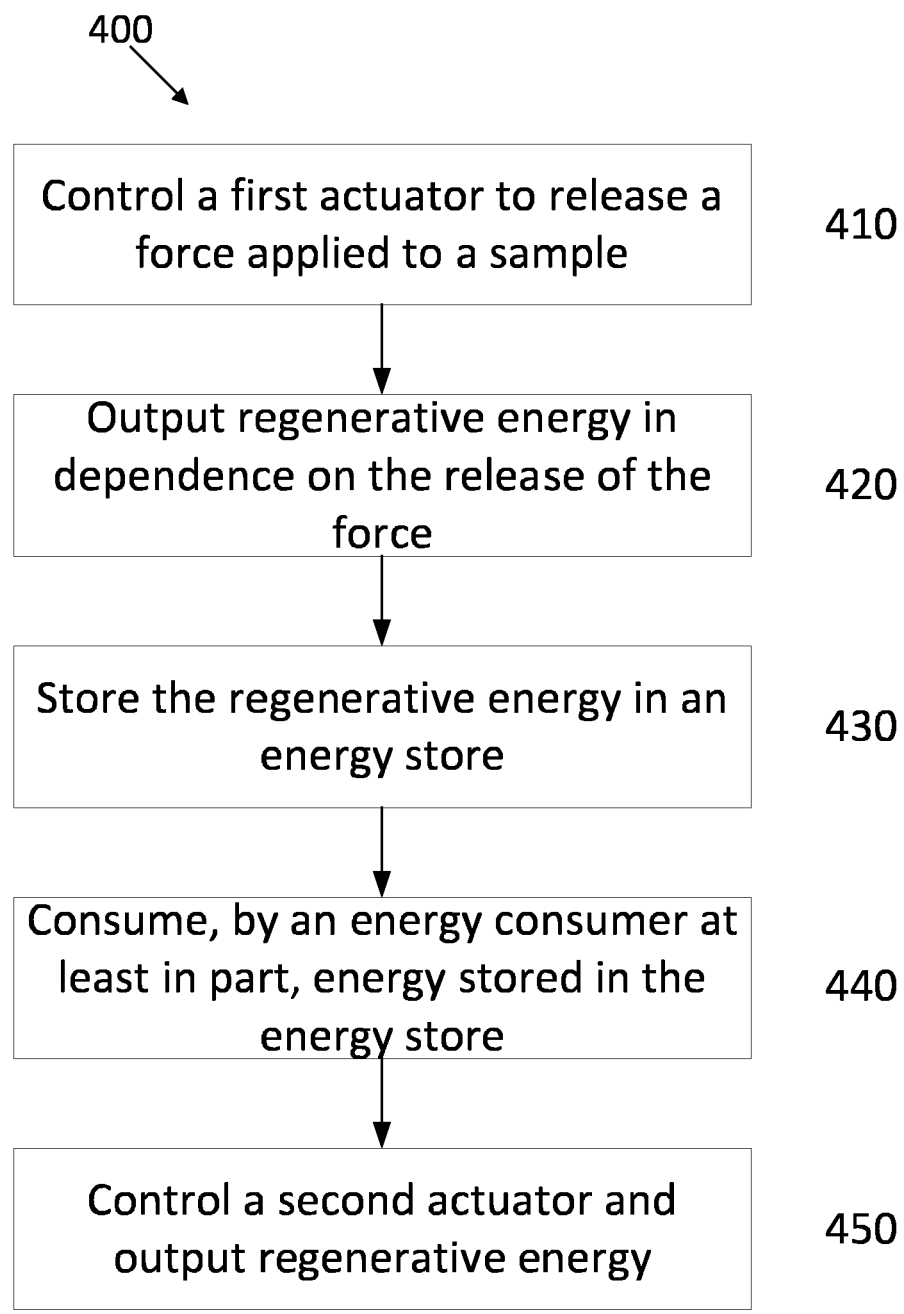
FIG. 4 illustrates a method according to an embodiment of the invention.

FIG. 4 illustrates a flowchart of a method 400 according to an embodiment of the invention. The method 400 may be performed by the material testing apparatus 100 described above and illustrated in FIGS. 1-3.

The method 400 comprises controlling 410 the first actuator 210 to release the force applied to the sample 130. The force applied to the sample 130 is a releasable force, which may be to test the physical properties of the sample 130. For example, the first actuator 210 may apply a deformation or testing force to the deform the sample 130, by one or more of stretching, compression or torsion.

The method 400 comprises outputting 420, by the first actuator 210, regenerative energy in dependence on the release of the force. As discussed above, at least some energy utilised to apply the releasable force may be retained within the sample 130. Thus, when the force applied to the sample is released, the method comprises outputting at least some of the retained energy by the sample 130 into the material testing apparatus 100 as regenerative energy. In particular, method step 420 may comprise outputting the regenerative energy in the form of electrical energy capable of being stored in an energy store, such as energy store 220.

The method 400 comprises storing 430 the regenerative energy from at least the first actuator 210 in an energy store 220, such as the energy store 220 of FIG. 2. Method step 430 may comprise storing the regenerative energy in at least one energy storage device of the energy store 220. Method step 430 may comprise storing the regenerative energy in at least one capacitor of the energy store 220.

The method 400 comprises consuming 440, by the energy consumer 230 at least in part, energy stored in the energy store 220. As discussed above, the energy consumer 230 comprises the first actuator 210. The method step 440 comprises consuming the energy in order to perform an operation. For example, method step 440 may comprise consuming, by the first actuator 210 at least in part, the energy stored in the energy store 220 to apply the releasable force to the sample 130.

The method 400 may also comprise the energy consumer 230 consuming energy from a different energy source in combination with the energy from the energy store 220. For example, the method 400 may comprise the energy consumer 230 consuming energy from a mains supply or a battery. When the energy store 220 is at least one capacitor and the method step 400 comprises the energy consumer 230 consuming the energy from the energy store 230, this may correspond to discharging the at least one capacitor. Method step 440 may comprise the second actuator, i.e. the actuator of the energy consumer 230 consuming, at least in part, the energy stored in the energy store 220 by applying a second force to the sample 130. Method step 440 may comprise the at least one of the cooling system, one or more control electronics and other subsystem of the material testing apparatus 100 consuming, at least in part, the energy stored in the energy store 220 by performing an operation.

The method 400 may comprise comprising controlling 450 of a second actuator of the energy consumer 230 and outputting, by the second actuator, regenerative energy. For example, when the second actuator releases a force, such as when performing an operation in which energy is released, the regenerative energy may be output. That is, the method 400 comprises outputting 420, by the first actuator 210, a first regenerative energy in dependence on the release of the force and optionally, outputting, by the second actuator a second regenerative energy.

The method step 450 may comprise controlling at least one of the cooling system, one or more control electronics and other subsystem of the material testing apparatus 100 and outputting, by at least one of the cooling system, one or more control electronics and other subsystem of the material testing apparatus 100, regenerative energy.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A material testing apparatus, comprising:
    a guide;
    a sample holding device configured to hold a sample;
    a first actuator configured to apply a releasable force to the sample;
    a crosshead supported on the guide and arranged to support at least a portion of one or both of the sample holding device and the first actuator;
    an energy store configured to store regenerative energy from at least the first actuator;
    an energy consumer configured to, at least in part, consume the energy from the energy store, wherein the energy consumer comprises the first actuator; and
    a controller configured to control the first actuator to release the force applied to the sample, wherein the first actuator is configured to output the regenerative energy in dependence on the release of the force.

2. The apparatus of claim 1, wherein the energy consumer comprises a second actuator.

3. The apparatus of claim 2, wherein the controller is configured to control the second actuator, wherein the second actuator is configured to output regenerative energy.

4. The apparatus of claim 1, wherein the energy store comprises at least one energy storage device.

5. The apparatus of claim 1, wherein the energy store comprises at least one capacitor.

6. The apparatus of claim 1, wherein the first actuator is arranged to, at least in part, consume the energy from the energy store to apply the releasable force to the sample.

7. The apparatus of claim 1, wherein the energy consumer comprises at least one of a cooling system or one or more control electronics.

8. A method of operating a material testing apparatus, the material testing apparatus comprising a guide, a sample holding means device for holding a sample, force means comprising a first actuator for applying a releasable force to the sample, a crosshead supported on the guide and arranged to support at least a portion of one or both of the sample holding device and the first actuator; and
    wherein the method comprises:
        controlling the first actuator to release the force applied to the sample;
        outputting, by the first actuator, regenerative energy in dependence on the release of the force;
        storing the regenerative energy from at least the first actuator in an energy store; and
        consuming, by an energy consumer at least in part, energy stored in the energy store, wherein the energy consumer comprises the first actuator.

9. The method of claim 8, comprising controlling of a second actuator of the energy consumer and outputting, by the second actuator, regenerative energy.

10. The method of claim 8, comprising storing the regenerative energy in at least one energy storage device of the energy store.

11. The method of claim 8, comprising storing the regenerative energy in at least one capacitor of the energy store.

12. The method of claim 8, comprising at least one of a cooling system or one or more control electronics consuming, at least in part, the energy from the energy store.

13. The method of claim 8, comprising consuming, by the first actuator at least in part, the energy from the energy store to apply the releasable force to the sample.

14. A non-transitory computer readable recording medium comprising computer readable instructions which, when executed by a processor, causes the processor to perform a method according to claim 8.

* * * * *